INVENTORS.
PAUL C. SMITH
RICHARD E. HYDE
BY Lyon+Lyon
ATTORNEYS

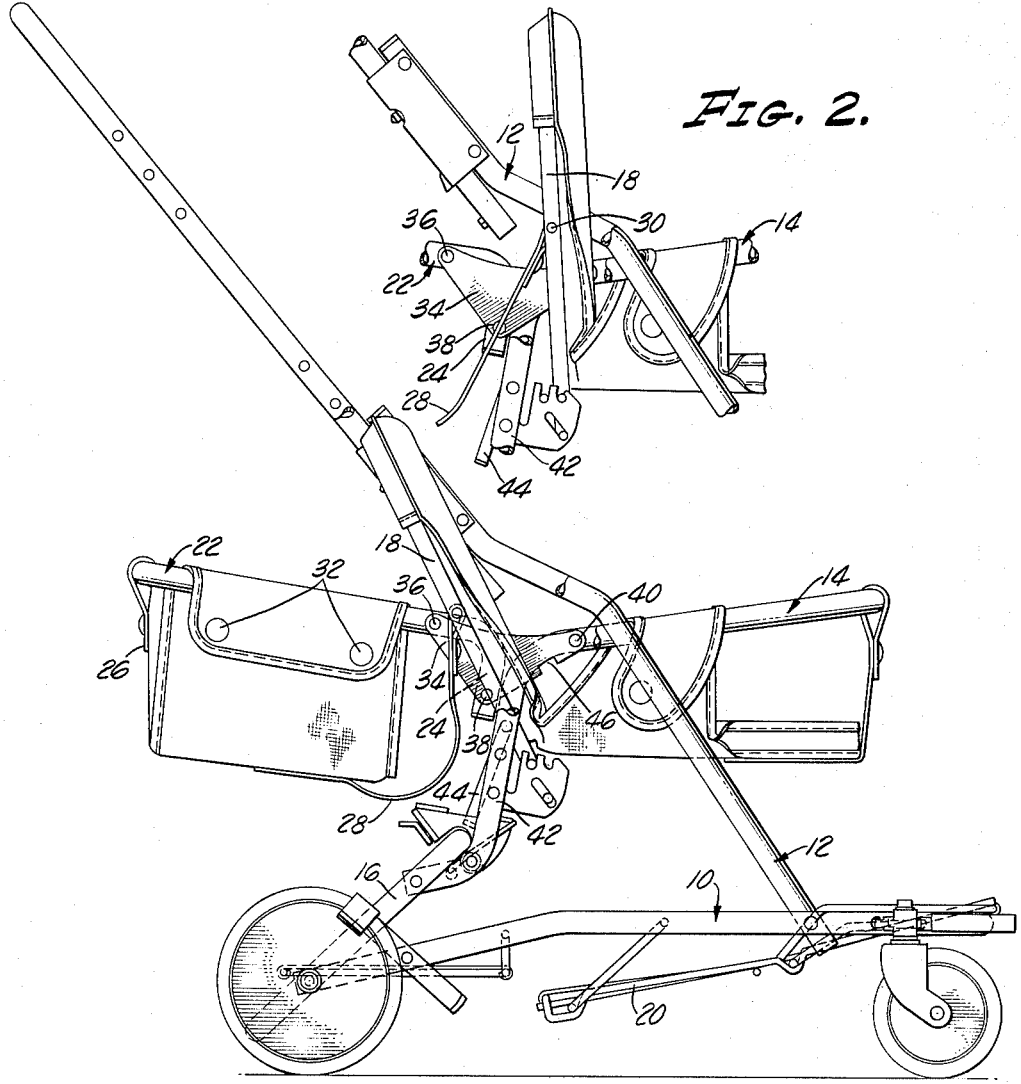

United States Patent Office 3,235,279
Patented Feb. 15, 1966

3,235,279
CONVERTIBLE BABY STROLLER
Paul C. Smith, Pacific Palisades, and Richard E. Hyde, Los Angeles, Calif., assignors to "Strolee" of California, Los Angeles, Calif., a corporation of California
Filed Apr. 13, 1964, Ser. No. 358,990
6 Claims. (Cl. 280—36)

This invention relates to an improved baby stroller.

It is an object of this invention to provide means whereby a stroller may be selectively arranged to accommodate either one or two infants.

It is a further object of this invention to provide such a stroller wherein an additional element functions in one position as an additional seat or as an additional support for the back rest when in the horizontal position and as a draft protective hood when in additional positions.

Still a further object of this invention is to permit the additional functions of the stroller without interfering with the normal folding of the stroller.

Other objects and advantages will be readily apparent from the following description.

In the drawings:

FIGURE 1 is a side elevation of a stroller embodying this invention adapted to support two infants.

FIGURE 2 is a fragmentary view similar to FIGURE 1 with the back rest in the upright position.

Figure 3:
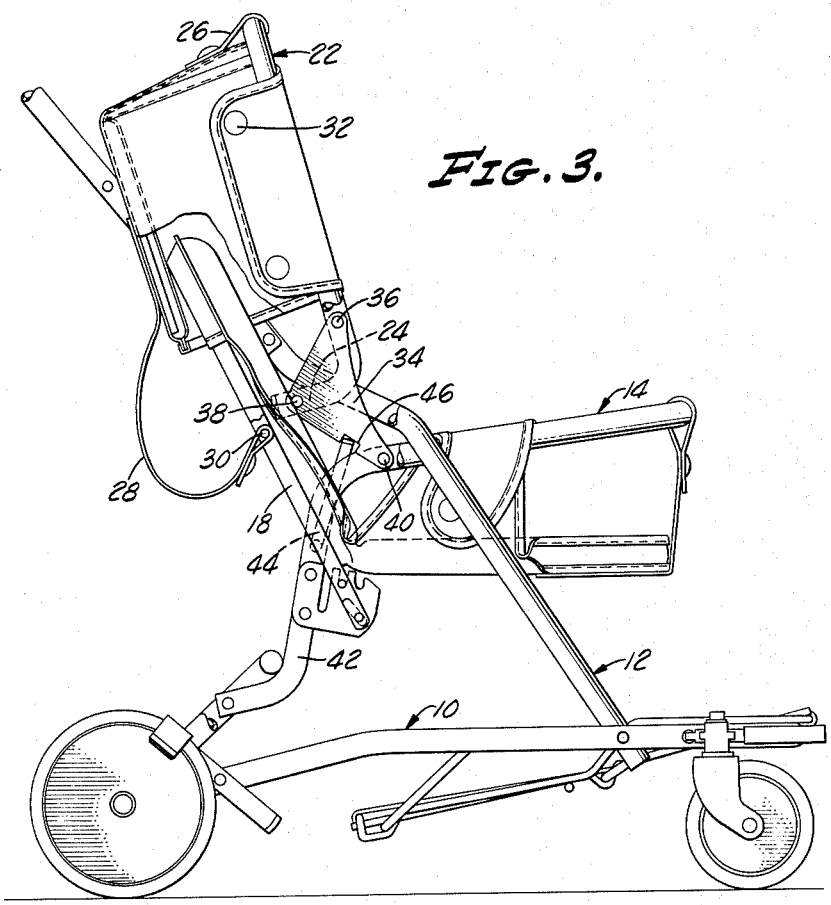
FIGURE 3 is a view similar to FIGURE 1 illustrating the protective hood feature.

In United States Letters Patent No. 2,728,580 the basic stroller is fully described having in essence a base frame 10, a handle frame 12 pivotally connected to the base frame, an arm rest frame 14 pivotally connected to the handle frame and an inverted U-shaped toggle bar 16.

Also, in United States Letters Patent No. 2,798,730 describes the construction and operation of the pivotal back rest 18 and foot rest 20. For further details regarding these features, reference is made to the above-identified patents.

A U-shaped frame 22 has the extremities 24 thereof bent at approximately right angles to the plane thereof. A cloth seat is suspended therefrom in the usual manner by strap 26 and strap 28 which is secured at the free extremity to cross bar 30 on back rest 18 and further, by folding over the frame at either side and secured by snaps 32.

A pair of triangular brackets 34 are secured one to each arm of frame 22 by pin 36 and by pin 38 to the extremity 24 thereof. The third corner of triangular bracket 34 is pivotally secured to arm rest frame 14 by a pin 40.

In the position seen in FIGURE 1, the frame 22 is in the approximately horizontal position and forms a seat for a second infant with the back rest 18 in the inclined position. The extremities 24 abut the downturned extremities 42 of the arm rest frame 14 to limit movement of frame 22.

In FIGURE 3 the frame 22 is pivoted upwardly to form a protective hood around the back rest 18 when a single infant is transported. A bar 44 is pivotally mounted upon each downturned extremity of the arm rest frame which when pivoted to the uppermost position, fits into a recess 46 of bracket 34 to hold the frame 22 in the position shown in FIGURE 3.

Figure 4:
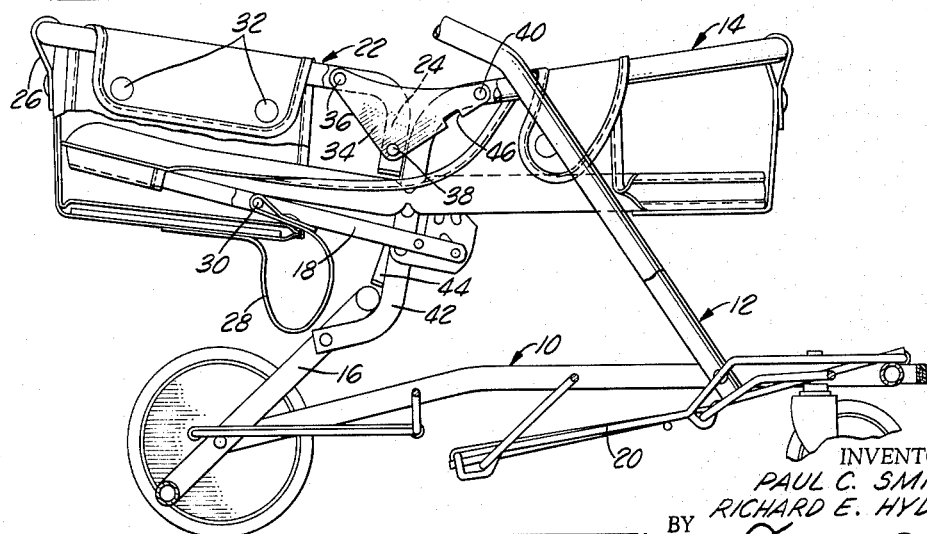
FIGURE 4 is a view similar to FIGURE 1 with the back rest in the horizontal position.

In FIGURE 4 the U-shape frame 22 is in the same position as in FIGURE 1. However, the back rest 18 is pivoted to the rearmost or approximately horizontal position wherein the seat on frame 22 forms support for the back rest 18 when the infant is reclining and also forms a protective hood.

When folding the stroller, frame 22 is pivoted fully forward until same overlies frame 14 and the seat thereon collapsed in the same manner as the seat suspended from arm rest frame 14, as is well known to those skilled in the art.

While what hereinbefore has been described is the preferred embodiment of this invention, it is readily apparent that alterations and modifications can be resorted to without departing from the scope of this invention and such alterations and modifications are intended to be included within the scope of the appended claims.

We claim:

1. In a baby stroller of the type having an arm rest frame from which a seat is suspended and a pivotally mounted back rest movable through pre-selected positions from a position forming an extension of said seat to a substantially upright position, the combination of: a frame member, a seat suspended from said frame member, bracket means pivotally mounting said frame member on said arm rest frame permitting movement through pre-selected positions from a substantially horizontal position supporting said back rest when the latter forms an extension of said seat to a substantially upright position wherein the seat suspended from said frame member forms a protective hood surrounding said back rest when same is in the upright position.

2. The combination set forth in claim 1 wherein said bracket means is rigidly attached to said frame member and pivotally secured to said arm rest frame.

3. In a baby stroller of the type having an arm rest frame from which a seat is suspended and a pivotally mounted back rest movable through pre-selected positions from a position forming an extension of said seat to a substantially upright position, the combination of: a frame member, a seat suspended from said frame member, bracket means pivotally mounting said frame member on said arm rest frame permitting movement through pre-selected positions from a substantially horizontal position supporting said back rest when the latter forms an extension of said seat to a substantially upright position wherein the seat suspended from said frame member forms a protective hood surrounding said back rest when same is in the upright position, and abutment means formed on said frame member engaging said arm rest frame when said frame member is in the substantially horizontal position.

4. In a baby stroller of the type having an arm rest frame from which a seat is suspended and a pivotally mounted back rest movable through pre-selected positions from a position forming an extension of said seat of: a frame member, a set suspended from said frame member, bracket means pivotally mounting said frame member on said arm rest frame permitting movement through pre-selected positions from a position forming an extension of said seat to a substantially upright position, the combination of: a frame member, a seat suspended from said frame member, bracket means pivotally mounting said frame member on said arm rest frame permitting movement through pre-selected positions from a substantially horizontal position supporting said back rest when the latter forms an extension of said seat to a substantially upright position wherein the seat suspended from said frame member forms a protective hood surrounding said back rest when same is in the upright position, and stop means pivotally mounted upon said arm rest frame for engaging said bracket and retaining said frame member in the substantially upright position.

5. In a baby stroller of the type having an arm rest frame from which a seat is suspended and a pivotally mounted back rest movable through pre-selected positions from a position forming an extension of said seat to a substantially upright position, the combination of: a frame member, a seat suspended from said frame member, bracket means pivotally mounting said frame member on said arm rest frame permitting movement through pre-selected positions from a substantially horizontal position supporting said back rest when the latter forms an extension of said seat to a substantially upright position wherein the seat suspended from said frame member forms a protective hood surrounding said back rest when same is in the upright position, stop means pivotally mounted upon said arm rest frame for engaging said bracket and retaining said frame member in the substantially upright position, and abutment means formed on said frame member engaging said arm rest frame when said frame member is in the substantially horizontal position.

6. In a baby stroller of the type having an arm rest frame from which a seat is suspended and a pivotally mounted back rest movable through pre-selected positions from a position forming an extension of said seat to a substantially upright position, the combination of: a frame member, a seat suspended from said frame member, bracket means pivotally mounting said frame member on said arm rest frame permitting movement through pre-selected positions from a substantially horizontal position supporting said back rest when the latter forms an extension of said seat to a substantially upright position wherein the seat suspended from said frame member forms a protective hood surrounding said back rest when same is in the upright position, stop means pivotally mounted upon said arm rest frame for engaging said bracket and retaining said frame member in the substantially upright position, and abutment means formed on said frame member engaging said arm rest frame when said frame member is in the substantially horizontal position wherein said bracket mean is rigidly attached to said frame member and pivotally secured to said arm rest frame.

References Cited by the Examiner

UNITED STATES PATENTS

| | | | |
|---|---|---|---|
| 633,431 | 9/1899 | Dann | 280—47.35 |
| 2,993,702 | 7/1961 | Gill | 280—47.35 X |

BENJAMIN HERSH, *Primary Examiner.*

ARTHUR L. LA POINT, *Examiner.*